Patented Jan. 7, 1936

2,026,817

UNITED STATES PATENT OFFICE 2,026,817

PROCESS FOR THE MAKING OF DYE BATHS AND PRINTING COLORS FOR NAPHTHOL DYEING

Heinrich Bertsch, Chemnitz, Germany, assignor to H. Th. Böhme, Aktiengesellschaft, Chemnitz, Germany, a corporation of Germany No Drawing. Application July 8, 1932, Serial No. 621,526. In Germany July 9, 1931

9 Claims. (Cl. 8—5)

This invention relates to dye baths and coloring materials and is particularly concerned with dispersion agents for use with naphthol dyes.

In the manufacture of bottoming baths for dyeing with naphthol-AS-dyes it has heretofore been customary to dissolve the naphthols by heating the same in a solution of Turkey red oil and sodium hydroxide. This process is not entirely satisfactory since the naphthol solutions thus formed are affected by substances normally present in hard water and also by metal salt solutions with which the dye solution is sometimes associated.

It has now been found that those sulphonates and sulphates of the higher aliphatic alcohols which contain free hydroxyl groups are very effective in dissolving naphthols. Such sulphonates can be obtained, for example, if unsaturated or polyhydroxy fatty alcohols are treated in such a way that sulphonation occurs primarily or exclusively in the double bond, the hydroxyl groups remaining free. This is accomplished by sulphonation at a very low temperature, for instance 0° C. Thus, for example, by sulphonation of ricinoleic alcohol (made by reduction of ricinoleic acid ethyl ester with sodium and butyl alcohol) with concentrated sulphuric acid at temperatures ranging from minus 5° C. to plus 5° C., a product is obtained which is essentially the mono-sulphuric acid ester of octodecantriol having two free hydroxyl groups. This material has been found to be an excellent dispersion agent having the greatest stability to acids, alkalies, and lime.

Very effective dispersing compounds can also be obtained if polyhydroxy alcohols, for instance alcohols formed by reduction of various sugars, are esterified with fatty acids and these esters sulphonated and sulphated with an amount of sulphuric acid so chosen that one or more hydroxyl groups remain free. In order to obtain such sulphonated and sulphated esters the following procedure may be observed. 100 grams of mannite are introduced into 600 grams of concentrated sulphuric acid, care being taken that the temperature does not rise above 40° to 50° C. After all of the mannite has been introduced and has gone into solution through partial esterification, 300 grams of oleic acid are added, the mixture being constantly stirred and slowly cooled, external cooling being preferably applied to maintain the temperature at approximately 30° to 35° C. When all of the oleic acid has been introduced, the resulting mixture will be soluble in water and completely clear. The reaction mixture may be then separated from the excess sulphuric acid in any well-known manner, for instance by washing with saturated Glauber's salt solution.

The manner in which the bottoming baths are produced will be more apparent from the following examples.

Example I 2 kg. of 2.3-oxynaphthoic acid-dianisidide are mixed with a solution of 0.5 kg. of sulphated oleic alcohol, which may be prepared as hereinbefore indicated, in 1 liter of soft water. 3 liters of boiling soft water are now added to form a paste of suitable consistency. This paste is carefully stirred with 5 liters of sodium hydroxide 34° Bé., mixed with 25 liters of boiling soft water, the whole being brought to the boiling point while being stirred. After the mixture is boiled for one to two minutes, all of the naphthol is dissolved. The resulting clear solution is then introduced into 165 liters of water at 60° to 70° C., previously rendered alkaline with 2 liters of sodium hydroxide 34° Bé. The major portion of the water, namely the 165 liters last added, may be hard water.

By following this procedure it is possible to produce a bottoming bath containing up to 3 to 4 grams 2.3 oxynaphthoic acid-dianisidide per liter even with hard water, which is not possible if Turkey red oil is employed.

Example II 1 kg. 2.3 oxynaphthoic acid-α-naphthalide is mixed with a solution of 0.2 kg. of the sodium salt of sulphonated oleic alcohol in 0.5 liter of water. This mixture is formed into a suitable paste with 0.75 liter of warm water (0°-7° d. H.). Three liters of sodium hydroxide 34° Bé. are then added, the mixture is stirred and by the addition of 20 liters of hot water accompanied by continued heating, the material is brought into solution. This is cooled by 20 liters of cold water to 50° C., 1 liter of 23% formaldehyde is added, and the solution is allowed to stand for five minutes and then diluted to the desired volume.

In accordance with this procedure excellent clear naphthol solutions may be obtained with a water of 10° d. H., 10 degrees of hardness (German scale) whereas with the use of Turkey red oil or soap, solutions which are turbid due to the presence of lime soaps result.

Example III 40 grams 2.3-oxynaphthoic acid-o-toluidide are dissolved with a solution of 20 grams of a sodium salt of ricinoleic alcohol sulphuric acid ester in 140 grams of water, the action being assisted by the addition of 60 grams of sodium hydroxide 45° Bé. accompanied by gentle heating. The solution is then introduced into 500 grams of neutral starch, tragacanth thickening, prepared from 150 grams zinc white paste 1:1 and 80 grams of sodium hydroxide 45° Bé. The sodium salt of ricinoleic alcohol phosphoric acid ester can be used in a similar manner instead of the sulphuric ester.

The use of these sulphonated and sulphated fatty alcohols is particularly important in the production of durable printing colors containing naphthol and one of the aforementioned dispersion agents, sodium hydroxide, and a metal compound, for example sodium zincate or zinc oxide in addition to a thickener. Heretofore it was not believed to be possible to make printing colors of this character since Turkey red oils and ricinoleic soaps formed insoluble zinc soaps with zinc compounds.

The printing color produced in accordance with Example III can also include durable diazo compounds and may be used as a resist on aniline black dyed goods.

In a manner similar to that described hereinbefore in connection with the use of sulphonated and sulphated ricinoleic and oleic alcohols, the salts of other sulphonated and sulphated fatty alcohols with free hydroxyl groups may be employed, and the sulphonated and sulphated fatty alcohol esters of fatty acids or analogous phosphated water soluble compounds form suitable dispersing agents. In all instances the action is an excellent one, particularly in connection with the dispersion of nearly insoluble and lime sensitive naphthols, and is distinctly superior to the action of dispersion agents heretofore used. It should be understood that the terms "sulphonation" and "sulphonated" have been used in their generic sense to cover both sulphation and true sulphonation.

Having thus described the invention, what is claimed as new and desired to be secured by Letters Patent is:

1. In a process of manufacturing dye baths and printing colors for naphthol dyeing, the step which comprises mixing a naphthol dye component with a dispersion agent comprising an aliphatic higher molecular alcohol ester of an inorganic oxygen-containing acid selected from the group consisting of sulphuric and phosphoric acids, said ester containing at least one free hydroxyl group.

2. In a process of manufacturing dye baths and printing colors for naphthol dyeing, the step which comprises mixing a naphthol dye component with a dispersion agent comprising a sulphonation product of a higher aliphatic alcohol containing at least one free hydroxyl group.

3. In a process of manufacturing dye baths and printing colors for naphthol dyeing, the step which comprises mixing a naphthol dye component with a dispersion agent comprising a sulphonation product of a polyhydroxy higher aliphatic alcohol, said sulphonation and sulphation product containing at least one free hydroxyl group.

4. In a process of manufacturing dye baths and printing colors for naphthol dyeing, the step which comprises mixing a naphthol dye component with a dispersion agent comprising a sulphonated fatty acid ester of a polyhydroxy high molecular aliphatic alcohol, said sulphonated ester containing at least one free hydroxyl group.

5. A coloring material including a naphthol dye component and a dispersion agent comprising a sulphonated high molecular alcohol of the fatty series containing at least one free hydroxyl group.

6. A coloring material including a naphthol dye component and a dispersion agent comprising the mono-sulphuric acid ester of octodecantriol.

7. A composition for use in the production of dye baths and printing colors comprising a mixture of a naphthol dye component and a sulphonation product of an unsaturated higher aliphatic alcohol, said sulphonation and sulphation product containing at least one free hydroxyl group.

8. In a process of manufacturing dye baths and printing colors for naphthol dyeing, the step which comprises mixing a naphthol dye component with a dispersion agent comprising a phosphated high molecular alcohol of the fatty series, said phosphated product containing at least one free hydroxyl group.

9. The process of increasing the dispersing power of a treatment liquid, which comprises mixing with the liquid a dispersion agent comprising a phosphated polyhydroxy alcohol of the fatty series, said phosphated product containing at least one free hydroxyl group.

HEINRICH BERTSCH.